(12) United States Patent
Ichizawa et al.

(10) Patent No.: US 7,438,405 B2
(45) Date of Patent: Oct. 21, 2008

(54) INK SET FOR INK JET RECORDING, INK JET RECORDING METHOD, AND INK JET RECORDING APPARATUS

(75) Inventors: Nobuyuki Ichizawa, Minamiashigara (JP); Yoshiro Yamashita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 433 days.

(21) Appl. No.: 10/866,685

(22) Filed: Jun. 15, 2004

(65) Prior Publication Data
US 2004/0257420 A1 Dec. 23, 2004

(30) Foreign Application Priority Data
Jun. 17, 2003 (JP) .............................. 2003-171860

(51) Int. Cl.
*G01D 11/00* (2006.01)
(52) U.S. Cl. ......................................... 347/100; 347/95
(58) Field of Classification Search ................. 347/100, 347/101, 95, 96; 523/160; 106/31.6, 31.27, 106/31.13
See application file for complete search history.

(56) References Cited
U.S. PATENT DOCUMENTS

| | | | | |
|---|---|---|---|---|
| 6,378,999 B1 * | 4/2002 | Doi et al. | ..................... | 347/100 |
| 6,399,674 B1 * | 6/2002 | Kashiwazaki et al. | ....... | 347/100 |
| 2003/0151642 A1 * | 8/2003 | Kaneko | ........................ | 347/43 |
| 2003/0218662 A1 * | 11/2003 | Kinomoto et al. | ........... | 347/100 |
| 2005/0012796 A1 * | 1/2005 | Doi et al. | ..................... | 347/100 |

FOREIGN PATENT DOCUMENTS

| | | | |
|---|---|---|---|
| JP | A 2001-152063 | | 6/2001 |
| JP | 2001-294788 | * | 10/2001 |
| JP | A 2001-294788 | | 10/2001 |

* cited by examiner

*Primary Examiner*—Manish S Shah
(74) *Attorney, Agent, or Firm*—Oliff & Berridge, PLC

(57) ABSTRACT

The present invention provides an ink set for ink jet recording, an ink jet recording method and an ink jet recording apparatus using the same. The ink set for ink jet recording includes a black ink and color inks including at least cyan, magenta and yellow inks. The black ink includes at least one coagulable agent, and one or more of the color inks is a coagulant-containing color ink containing a coagulant. The contact angle of each of the black ink and the color inks to a recording material is about 50° or less after 1 second of contact. The surface tension of each of the black ink and the color inks is about 40 mN/m or less. The difference between the surface tension of the black ink and that of the coagulant-containing color ink is about 5 mN/m or less.

5 Claims, No Drawings

INK SET FOR INK JET RECORDING, INK JET RECORDING METHOD, AND INK JET RECORDING APPARATUS

CROSS-REFERENCE TO RELATED APPLICATION

This application claims priority under 35 USC 119 from Japanese Patent Application No. 2003-171860, the disclosure of which is incorporated by reference herein.

BACKGROUND OF THE INVENTION

1. Field of the Invention

The present invention relates to an ink set for ink jet recording used in high-speed ink jet printers, an ink jet recording method and an ink jet recording apparatus.

2. Description of the Related Art

So-called ink jet system printers which record images by ejecting liquid or molten solid inks from nozzles, slits, or porous films onto paper, cloth, or a film are widely used, since they have many advantages such as compactness, moderate price, and silent operation, in particular since they allow full color printing by ejecting 3 or 4 colors simultaneously.

Recently, ink jet printers have increasingly achieved higher image quality and speed. However, a balance between the drying characteristics of inks and image quality is essential for high-speed printing. Usually, the permeability of inks is increased for improving the drying characteristics thereof, but this method also causes decrease in optical density and in character quality at the same time. This balance is particularly important for black inks, which are used to print characters.

Although divided printing using a longer printing head is one method for accommodating high-speed printing, division does not provide sufficiently high printing speed. Another method for this purpose is the use of reactions between inks. For example, a method of printing images by using a black ink suitably improved in drying characteristics and reactive color inks at the same time is disclosed. Although a balance between the drying characteristics of inks and optical density and character quality is established to some degree by this method, sufficient drying characteristics have not yet been obtained (e.g., see Japanese Patent Application Laid-Open (JP-A) No. 2001-152063).

Further, another method of printing images using a black ink improved in drying characteristics and reactive color inks at the same time is disclosed. The method is compatible with high-speed printing, has superior ink-drying characteristics and allows high optical density, but does not provide sufficient character quality. Accordingly, there exists a need for inks having favorable drying characteristics, high optical density, and excellent character quality compatible with high-speed printing (e.g., see JP-A No. 2001-294788).

Therefore, there is a demand for an ink set for ink jet recording compatible with high-speed ink jet printers that dries rapidly and provides images higher in optical density and printing evenness in full color printing, and an ink jet recording method and an ink jet recording apparatus that allow rapid drying of the inks and printing of images higher in optical density and excellent in character quality.

SUMMARY OF THE INVENTION

The above demand is satisfied by the invention described below.

A first aspect of the invention provides an ink set for ink jet recording, comprising a black ink and color inks including at least cyan, magenta and yellow inks, the black ink comprising a colorant, a water-soluble organic solvent, a coagulable agent and water, and at least one of the color inks being a coagulant-containing color ink comprising a colorant, a water-soluble organic solvent and a coagulant, wherein a contact angle of each of the black ink and the color inks to a recording material is about 50° or less after 1 second of contact; each of the black ink and the color inks has a surface tension of about 40 mN/m or less; and the difference between the surface tension of the black ink and that of the coagulant-containing color ink is about 5 mN/m or less.

A second aspect of the invention provides an ink jet recording method of recording an image using an ink set for ink jet recording comprising a black ink and color inks including at least cyan, magenta, and yellow inks, the black ink comprising a colorant, an organic solvent, a coagulable agent and water, and at least one of the color inks being a coagulant-containing color ink comprising a colorant, an organic solvent and a coagulant, wherein the image is printed in such a manner that: a contact angle of each of the black ink and the color inks to a recording material becomes about 50° or less after 1 second of contact; a printing density of the black ink becomes about 2.5 to about 4 mg/inch$^2$; a total printing density of the coagulant-containing color ink used becomes about 0.8 to about 4 mg/inch$^2$; and a total printing density of the black ink and the coagulant-containing color ink used becomes about 6 mg/inch$^2$ or less.

A third aspect of the invention provides an ink jet recording apparatus comprising: a container for containing an ink set for ink jet recording comprising a black ink and one or more color inks including at least one coagulant-containing color ink; a conveyor for conveying a recording material; ink jet recording heads for printing an image by ejecting each ink onto the recording material conveyed by the conveyor; and an image signal input unit for inputting an image signal to the ink jet recording heads; wherein the ink set for ink jet recording is the ink set for ink jet recording described above; and the image is printed by using the black ink, and the one or more color inks containing the at least one coagulant-containing color ink, at a printing density of the black ink of about 2.5 to about 4 mg/inch$^2$, at a total printing density of the at least one coagulant-containing color ink used of about 0.8 to about 4 mg/inch$^2$, and at a total printing density of the black ink and the at least one coagulant-containing color ink used of about 6 mg/inch$^2$ or less.

DETAILED DESCRIPTION OF THE INVENTION

An ink set for ink jet recording of the invention includes a black ink and color inks containing at least cyan, magenta and yellow inks. The black ink includes a colorant, a water-soluble organic solvent, a coagulable agent and water. At least one of the color inks is a coagulant-containing color ink containing a colorant, a water-soluble organic solvent and a coagulant. The contact angle of each of the black ink and the color inks to a recording material is about 50° or less, and the surface tension of each of the black ink and the color inks is about 40 mN/m or less, and the difference between the surface tension of the black ink and that of the coagulant-containing color ink is about 5 mN/m or less.

Hereinafter, the ink set for ink jet recording of the invention will be described in detail.

In the ink set for ink jet recording of the invention, the contact angle of each of the black ink and the color inks to a recording material is about 50° or less after 1 second of contact. Therefore, each ink, especially the black ink, dries faster, and the ink set for ink jet recording is compatible with high-speed ink jet printers. When the contact angle is more than 50°, permeability of such an ink is bad, and then the ink dries slower. Therefore, when an image is printed by using such an ink and a high-speed ink jet printer, the ink which has not yet dried causes stain on paper. The contact angle is preferably not larger than about 35°.

The contact angle of an ink in the specification is a so-called contact angle of an ink droplet dripped onto predetermined paper, namely, an angle between the ink droplet surface and the surface of the paper at a contact area of the ink droplet and the paper, when a predetermined period of time has been lapsed from dripping of the ink droplet. When the whole of the ink droplet penetrates into the paper, and the contact angle is 0°.

The paper used for contact-angle measurement in the invention is preferably plain paper, including L Paper manufactured by Fuji Xerox Co., Ltd.

In the invention, the contact angle is measured in an environment of 23° C. and 55% RH, using FIBRO 1100DAT MKII Dynamic Absorption Tester (manufactured by FIBRO system). In the measurement, the droplet quantity is set at 4.0 μl. The dripping force is set at 6.0. Given that the time when the measurement has started is set at 0 seconds, dynamic contact angles are measured over a period of 100 seconds from the initiation of the measurement or, if the tester automatically terminates the measurement within 100 seconds, until the termination), and the value when one second has lapsed from the initiation is designated as the contact angle.

In addition, since the black ink thereof includes a colorant, a water-soluble organic solvent, a coagulable agent and water, and at least one of the color inks is a coagulant-containing color ink including a colorant, a water-soluble organic solvent and a coagulant, the ink set for ink jet recording of the invention can provide a high optical density.

Thus, the ink set allows higher drying speed of inks and higher optical density of printed images.

Moreover, in the ink set for ink jet recording of the invention, each of the black ink and the color inks (hereinafter, referred to as "each ink") has a surface tension of about 40 mN/m or less, and the difference between the surface tension of the black ink and that of the coagulant-containing color ink is about 5 mN/m or less. The surface tension of inks may be adjusted by adding a penetrant described later to the inks. Since the time interval between a time when ejection of the black ink has finished and a time when ejection of the coagulant-containing color ink has started or vice versa is short in high-speed inkjet printers, wettability of the ink to a recording paper and wettability between inks are very important. When the surface tension of each ink is more than 40 mN/m, the wettability of the ink to a recording material is bad, resulting in generation of printed images uneven in density. The surface tension is preferably about 37 mN/m or less, and more preferably about 35 mN/m or less.

In addition, the difference between the surface tension of the black ink and that of the coagulant-containing color ink is preferably about 4 mN/m or less, and more preferably about 2 mN/m or less. When the difference is more than 5 mN/m, wettability between inks is bad, and then uneven images are printed, and spots of color inks appear in images printed with a black ink.

The black ink in the invention includes as essential components a colorant, a water-soluble organic solvent, a coagulable agent and water, and, if necessary, contains a surfactant, a pH controlling agent, a hydrotropic agent, a chelating agent, a clathrate compound, an oxidant, an antioxidant, a reducing agent, an enzyme, a bactericide, an antifoaming agent, an abrasive, and/or other additives.

On the other hand, the color inks in the invention include at least, a cyan ink, a magenta ink and a yellow ink, and each color ink includes as essential components a colorant, a water-soluble organic solvent and water, and at least one of the color inks contains a coagulant. Further, the color inks may contain a pH controlling agent, a polymer, a hydrotropic agent, a chelating agent, a clathrate compound, an oxidant, an antioxidant, a reducing agent, an enzyme, a bactericide, an antifoaming agent, an abrasive, and/or other additives.

Examples of the colorant contained in the black ink used in the invention include carbon black, and acid dyes and direct dyes which are water-soluble black inks. Carbon black is preferable among them. The carbon black can be furnace black, lamp black, acetylene black, and/or channel black. Typical examples thereof include, but are not limited to, Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060 ULTRA, Raven 790 ULTRA, Raven 780 ULTRA, and Raven 760 ULTRA (manufacture by Columbia); Regal 400R, Regal 330R, Regal 660R, Mogul L, Black Pearls L, Black Pearls 1300, Monarch 700, Monarch 800, Monarch 880, Monarch 900, Monarch 1000, Monarch 1100, Monarch 1300, and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (manufactured by Degussa); and No. 25, No. 33, No. 40, No. 47, No. 52, No. 900, No. 2300, MCF-88, MA600, MA7, MA8, and MA100 (manufactured by Mitsubishi Chemical Co., Ltd.). Magnetic fine particles such as magnetite and ferrite, and/or titan black may be used together with the carbon black pigment. In addition, pigments of three primary colors including cyan, magenta, and yellow; and/or pigments having a particular color such as red, green, blue, brown, or white; pigments having metallic luster such as gold and silver; colorless extender pigments; and/or plastic pigments may also be used together with carbon black.

Since a dispersant is needed to disperse carbon black which is not self-dispersible and interaction between the dispersant and a penetrant may deteriorate dispersion stability, the carbon black is preferably a self-dispersible pigment. The self-dispersible pigment is a pigment that is dispersible by itself in a solvent without a dispersant such as a surfactant or a polymer dispersant. Generally, the self-dispersible pigment has at least one hydrophilic functional group on the surface thereof. In the invention, it is determined by the following self-dispersion test whether a particular pigment (carbon black) is a "self-dispersible type" or not.

Self-Dispersion Test

A sample pigment is added to water and dispersed therein without a dispersant by using a dispersing device such as an ultrasonic homogenizer, a nanomizer, a microfluidizer, or a ball mill. The resulting dispersion is diluted with water to an initial pigment concentration of about 5%. 100 g of the diluted dispersion is placed in a glass bottle having a diameter of 40 mm, and the bottle is allowed to stand for a day. Subsequently, the pigment concentration of the upper layer of the dispersion is measured. If a ratio of the pigment concentration after leaving for one day to the initial pigment concentration (hereinafter, referred to as a "self dispersion index") is 98% or more, the pigment is regarded as a "self-dispersible type" pigment.

A method for measuring a pigment concentration is not particularly limited, and may be a method in which a sample is dried and the content of solid matter obtained is measured to measure a pigment concentration, or a method of measuring a pigment concentration from the light transmittance of a suitably diluted samplee. Any other methods that allow correct measurement of a pigment concentration may also be used, if any.

A method of introducing a hydrophilic functional group onto a pigment include both known and newly discovered methods. Examples thereof include known methods in which a pigment is subjected to oxidation with an oxidant (e.g., nitric acid, permanganate, bichromate, hypochlorite, ammonium persulfate, hydrogen peroxide, ozone, or ozone water), treatment with a sulfonating agent, treatment with a coupling agent such as a silane compound, polymer grafting treatment, plasma treatment, or treatment with a diazonium salt compound having a hydrophilic group, and newly developed methods. These methods may be used in combination. The amount of the hydrophilic functional groups may be adjusted by controlling the processing concentration and time. In addition, the surface functional group of a commercially available self-dispersible pigment may be modified (e.g., esterified).

Examples of the commercially available self-dispersible pigment usable in the invention include MICROJET (BON-JET) BLACK CW-1 (manufactured by Orient Chemical Industries, Ltd.), and CAB-O-JET 200 and CAB-O-JET 300 (manufactured by Cabot Corporation). All of these commercially available self-dispersible pigments have a self-dispersion index of 100%.

The content of the carbon black in the black ink used in the invention is preferably in the range of about 0.1 to about 10% by mass, more preferably in the range of about 1 to about 7% by mass, and still more preferably in the range of about 1 to about 5% by mass with respect to the total ink quantity. A carbon black content of more than 10% by mass may cause water contained in the ink to easily evaporate at nozzle tips, resulting in more frequent clogging. On the other hand, a carbon black content of less than 0.1% by mass may not provide images having a sufficiently high density.

In addition, when the carbon black is used as the colorant in the black ink, the diameter of the carbon black particles is preferably in the range of about 10 nm to about 120 nm. Carbon black having a particle diameter of more than 120 nm may cause clogging in the ink channels of heads during disuse. The particle diameter may be measured by using a commercially available analyzer, such as a decanter, a laser diffraction (light scattering) device, an ESA device, a device using a capillary, or an electron microscope. Measurement by Microtrack UPA9340 (manufactured by Leeds & Northrup) employing a dynamic light-scattering method is preferable. The particle diameter in the invention is defined as a value obtained by measuring the particles diameter of a sample ink as it is without dilution. The viscosity of the sample ink and the density of carbon black contained in the sample ink are used as a viscosity and the density of dispersion particles which are parameters input to the device, respectively.

In the invention, the viscosity of a stock ink (ink which has not been diluted) is used as a solvent viscosity.

Both a dye and a pigment may be used as the colorant contained in the color ink used in the invention. However, use of a water-soluble dye is preferable, since it can provide images with vivid colors. The water-soluble dye may be any of an acid dye, a direct dye, a basic dye, and a reactive dye, but is more preferably an acid dye or a direct dye. Examples of the acid and direct dyes include: C.I. Direct Blue-1, -2, -6, -8, -22, -34, -70, -71, -76, -78, -86, -112, -142, -165, -199, -200, -201, -202, -203, -207, -218, -236, and -287; C.I. Direct Red- 1, -2, -4, -8, -9, - 11, -13, -15, -20, -28, -31, -33, -37, -39, -51, -59, -62, -63, -73, -75, -80, -81, -83, -87, -90, -94, -95, -99, -101, -110, -189, and -227; C.I. Direct Yellow-1, -2, -4, -8, -11, -12, -26, -27, -28, -33, -34, -41, -44, -48, -58, -86, -87, -88, -135, -142, and -144; C.I. Acid Blue-1, -7, -9, -15, -22, -23, -27, -29, -40, -43, -55, -59, -62, -78, -80, -81, -83, -90, -102, -104, -111, -185, -249, and -254; C.I. Acid Red-1, -4, -8, -13, -14, -15, -18, -21, -26, -35, -37, -110, -144, -180, -249, and -257; and C.I. Acid Yellow-1, -3, -4, -7, -11, -12, -13, -14, -18, -19, -23, -25, -34, -38, -41, -42, -44, -53, -55, -61, -71, -76, -78, -79, and -122.

In addition, examples of the cationic dyes include: C.I. Basic Yellow-1, -11, -13, -19, -25, -33, and -36; C.I. Basic Red-1, -2, -9, -12, -13, -38, -39, and -92: C.I. Basic Blue-1, -3, -5, -9, and -19; and C.I.-24, -25, -26, and -28.

The content of the dye is preferably in the range of about 0.3 to about 15% by mass, and more preferable in the range of about 1 to about 10% by mass with respect the total liquid amount in ink. A content of the dye of over 15% by mass may cause water contained in the ink to easily evaporate at nozzle tips, resulting in more frequent clogging. On the other hand, color inks having a content of the dye of less than 0.3% by mass may not provide images having a sufficiently high density.

These dyes may be used alone or as a mixture of two or more dyes. Alternatively, the color of the ink may be made any of four primary colors, cyan, magenta, yellow, and black, and custom colors, such as red, blue, and green.

The type of the pigment in the color ink is not particularly limited, and examples of the pigment in the color ink include the following.

Examples of cyan pigments include C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22, and C.I. Pigment Blue-60.

Examples of magenta pigments include C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, C.I. and Pigment Violet 1960.

Examples of yellow pigments include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-55, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow- 128, C.I. Pigment Yellow-129, C.I. Pigment Yellow-150, C.I. Pigment Yellow-151, C.I. Pigment Yellow-154, C.I. Pigment Yellow-180, and C.I. Pigment Yellow-185.

Alternatively, pigments may be newly prepared for the invention. In addition, two or more pigments may be mixed and used.

Like carbon black in the black ink, a self-dispersible pigment having at least one hydrophilic functional group on the surface thereof may be preferably used as the pigment in the color inks. A method of introducing a hydrophilic functional group to a pigment in color inks are similar to the method for introducing a hydrophilic functional group to carbon black in the black ink. The definition of the term "self-dispersible type" is the same as that mentioned in the descriptions of carbon black.

The content of the pigment in the color ink is preferably in the range of about 0.1 to about 10% by mass, more preferably in the range of about 1 to about 7% by mass, and still more preferably in the range of about 1 to about 5% by mass with respect to the total ink quantity. A content of the pigment of over 10% by mass may cause water contained in the ink to easily evaporate at nozzle tips, and then more frequent clogging. On the other hand, color inks having a content of a pigment of less than 0.1% by mass may not provide images having a sufficiently high density. The colorants in the color inks may be used alone or in combination. In addition, the colors of the color inks may be any of three primary colors, including cyan, magenta and yellow, and custom colors, such as red, blue, and green.

It is preferable to purify the colorant of a color ink by removing therefrom contaminants introduced during a manufacturing process, such as impurities including a remaining oxidant, a remaining processing agent, and byproducts, and/or other inorganic and organic impurities. In particular, the respective contents of calcium, iron, and silicon in the ink are preferably reduced to about 10 ppm or less, and more preferably about 5 ppm or less. The contents of these inorganic impurities may be measured, for example, by radio frequency inductively coupled-plasma emission spectroscopy These impurities may be removed, for example, by using one or more of conventional methods including a method of rinsing with water, and methods using reverse osmosis membrane, ultrafiltration membrane filtration, ion exchange or adsorption with activated carbon or zeolite.

When a pigment (e.g., carbon black) which is not self-dispersible is used as the colorant in the black ink used in the invention, and when a pigment which is not self-dispersible is used in the color ink used in the invention, a dispersant may be additionally used to disperse the pigment in the ink. A surfactant or a water-soluble polymer may be used as the dispersant. When a water-soluble anionic polymer is used as the dispersant, it also acts as a coagulable agent. Water-soluble polymers known in the art including synthetic polymers and resins derived from natural materials may be used, and a copolymer is preferably used as the water-soluble polymer.

The copolymer is preferably one obtained by copolymerizing a monomer having at least one $\alpha,\beta$-ethylenically unsaturated group which forms a hydrophilic portion, and a monomer having at least one $\alpha,\beta$-ethylenically unsaturated group which forms a hydrophobic portion. In addition, homopolymers of a monomer having an $\alpha,\beta$-ethylenically unsaturated group which has a hydrophilic group may also be used.

Examples of the monomers having an $\alpha,\beta$-ethylenically unsaturated group which forms a hydrophilic portion include monomers having a carboxyl, sulfonic acid, hydroxyl, or polyoxyethylene group. Monomers including a carboxyl or sulfonic acid group are preferable. Specific examples thereof include acrylic acid, methacrylic acid, crotonic acid, itaconic acid, itaconic monoesters, maleic acid, maleic monoesters, fumaric acid, fumaric monoesters, vinylsulfonic acid, styrenesulfonic acid, and sulfonated vinylnaphthalenes. Among them, monomers having a carboxyl group are particularly preferable, and specific examples thereof include, but are not limited to, acrylic acid, methacrylic acid, maleic acid, crotonic acid, itaconic acid, itaconic monoesters, maleic acid, maleic monoesters, fumaric acid, and fumaric monoesters.

Examples of the monomers having an $\alpha,\beta$-ethylenically unsaturated group which forms a hydrophobic portion include, but are not limited to: styrene derivatives such as styrene, $\alpha$-methylstyrene, and vinyltoluene; vinylnaphthalene, vinylnaphthalene derivatives, alkyl acrylates, alkyl methacrylates, alkyl crotonates, dialkyl itaconates, and dialkyl maleates.

The weight-average molecular weight of the dispersant is not particularly limited, but preferably in the range of about 3,000 to about 15,000, and more preferably in the range of about 4,000 to about 7,000. When the weight-average molecular weight of the dispersant is less than 3,000, such an ink may have inferior dispersion stability. When the weight-average molecular weight of the dispersant is more than 15,000, such an ink may have a high viscosity, instabilizing ink ejection.

Various methods of measuring the average molecular weight of water-soluble polymers are known, but the average molecular weight in the invention is defined as a value obtained by gel permeation chromatography (GPC).

The dispersant included in each of the inks used in the invention is preferably a copolymer or a neutralized salt thereof. The dispersant may be neutralized with any basic substance, but preferably with a basic substance containing at least one alkali metal hydroxide. The alkali metal hydroxide can be NaOH, KOH, and/or LiOH, and NaOH is preferable among them.

The preferable content of the dispersant with respect to a pigment depends on the particle diameter, specific surface area, and/or surface structure of the pigment, but the weight ratio of the pigment to the water-soluble polymer is in the range of about 10:8 to about 10:0.5.

Any commercially available dispersing machine may be used for dispersion. Examples thereof include a colloid mill, a flow jet mill, a slasher mill, a high-speed disperser, a ball mill, an attritor, a sand mill, a sand grinder, an ultrafine mill, an Eiger motor mill, a DYNO-Mill, a pearl mill, an agitator mill, a cobol mill, a three roll-mill, a two roll-mill, an extruder, a kneader, a microfluidizer, a laboratory homogenizer, and an ultrasonic homogenizer. These dispersing machines may be used alone or in combination.

Further, for prevention of contamination with inorganic impurities, dispersion methods requiring no dispersion medium are preferable, and thus a microfluidizer, and/or an ultrasonic homogenizer is suitable for that purpose. In order to improve dispersion efficiency, it is preferable to deaerate and defoam an aqueous solution to be used in the dispersion. The pH of the aqueous solution during dispersion is preferably about 9 or less.

Examples of the coagulable agent contained in the black ink in the invention include anionic polymers, anionic colorants, and anionic surfactants, and anionic polymers are preferable among them.

The anionic polymer can be a water-soluble anionic polymer or anionic polymer colloid (polymer emulsion).

When a pigment which is not self-dispersible is used and an anionic polymer is used as a dispersant to disperse the pigment, the dispersant also functions as a coagulable agent.

Examples of the polymer colloid include acrylic resin emulsions, polyvinyl acetate resin emulsions, polyurethane resin emulsions, acrylic-styrene resin emulsions, butadiene resin emulsions, styrene resin emulsions, polyester resin emulsions, silicone resin emulsions, fluorinated resin emulsions, and acrylic silicone resin emulsions.

Examples of the water-soluble anionic polymer include: (1) homopolymers of a hydrophilic monomer component having a hydrophobic portion which can bind to a pigment particle surface and a hydrophilic portion including a $SO_3H$ group, and salts thereof; (2) copolymers of a hydrophobic monomer component and a hydrophilic monomer component having a $SO_3H$ group, and salts thereof; (3) polymers obtained by hydrophilizing, specifically sulfonating, homopolymers of a hydrophobic monomer component or copolymers of two or more hydrophobic monomer components, and salts thereof; (4) homopolymers of a hydrophilic monomer component including a hydrophobic portion and a hydrophilic portion having a $H_3PO_4$ group, and salts thereof; (5) copolymers of a hydrophobic monomer component and a hydrophilic monomer component having a $H_3PO_4$ group, and salts thereof; (6) homopolymers of a hydrophilic monomer component including a hydrophobic portion and a hydrophilic portion having a COOH group, and salts thereof; and (7) copolymers of a hydrophobic monomer component and a hydrophilic monomer component having a COOH group, and salts thereof. The carboxylate polymers (6) and (7) are preferable, since they are more effective as a coagulable agent. In addition, any other component may be copolymerized with the above monomer, as needed. Further, such a polymer may be used in combination with the above polymer.

When the water-soluble anionic polymer is a copolymer, it may be any of random, graft, and block copolymers. Examples of counter cations in salts of water-soluble anionic polymer include, but are not limited to, alkali metals; alcohol amines such as monoethanolamine, diethanolamine, and triethanolamine; onium salt compounds such as an ammonium ion, a sulfonium ion, an oxonium ion, a stibonium ion, a stannonium ion, and an iodonium ion.

Examples of the hydrophilic monomer components having a $SO_3H$ group include styrenesulfonic acid, styrenesulfonic acid derivatives, benzenesulfonic acid, benzenesulfonic acid derivatives, naphthalenesulfonic acid, naphthalenesulfonic acid derivatives, toluenesulfonic acid, toluenesulfonic acid derivatives, vinylsulfonic acid, and vinylsulfonic acid derivatives. Among them, vinylsulfonic acid, vinylsulfonic acid derivatives, naphthalenesulfonic acid, naphthalenesulfonic acid derivatives, styrenesulfonic acid, and styrenesulfonic acid derivatives are preferable.

Examples of the hydrophilic monomer components containing a $H_3PO_4$ group include higher alkylphosphoric esters, and phosphoric esters of higher alcohol ethyleneoxide adducts.

Examples of the hydrophilic monomer components having a COOH group include $\alpha,\beta$-ethylenically unsaturated carboxylic acids and aliphatic alcohol esters thereof, such as acrylic acid, acrylic acid derivatives, methacrylic acid, methacrylic acid derivatives, maleic acid, maleic acid derivatives, itaconic acid, itaconic acid derivatives, fumaric acid, and fumaric derivatives. Among them, acrylic acid, acrylic acid derivatives, methacrylic acid, and methacrylic acid derivatives are preferable.

Examples of the hydrophobic monomer components include styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkyl acrylates, and alkyl methacrylates. Among them, styrene, styrene derivatives, alkyl acrylates, and alkyl methacrylates are preferable. The alkyl group of alkyl acrylates and alkyl methacrylates preferably has 1 to 10 carbon atoms, and more preferably 1 to 6 carbon atoms.

Examples of other components include acrylamide, acrylamide derivatives, dimethylaminoethyl methacrylate, ethoxyethyl methacrylate, butoxyethyl methacrylate, ethoxytriethylene methacrylate, vinylpyrrolidone, vinylpyridine, components having a polyoxyethylene unit such as alkoxy- or methoxy-polyethylene glycol methacrylate, and polyethylene glycol methacrylate; and components having a hydroxyl group such as hydroxymethyl methacrylate, hydroxyethyl methacrylate, and vinyl alcohol.

Further, the water-soluble polymer may be one prepared by addition-polymerizing a hydrophilic monomer component and a condensation polymer (polyester-based condensation polymer) made of an unsaturated carboxylic acid and an alcohol or a glycol and serving as a hydrophobic component. In addition, water-soluble polymers such as carboxylic acid-modified polyvinylalcohol and carboxymethylcellulose may also be used. However, the water-soluble polymer is not limited to these examples.

The weight average molecular weight of the water-soluble polymers serving as a coagulable agent is preferably in the range of about 3,000 to about 20,000 in consideration of an ink viscosity. The weight-average molecular weight can be measured by a light-scattering method, a X-ray small angle scattering method, a sedimentation equilibrium method, a diffusion method, an ultracentrifugal method, or a chromatographic method such as a GPC method. The measured value which is converted to polyethylene glycol can be used as the weight average molecular weight.

The content of the water-soluble polymer is preferably in the range of about 0.1% to about 5% by mass, and more preferably in the range of about 0.1 to about 3% by mass with respect to the total ink amount. A content of the water-soluble polymer of less than 0.1% by mass may provide images having an insufficiently high optical density. On the other hand, a content of the water-soluble polymer of more than 5% by mass may result in increased ink viscosity, consequently leading to ejection failure or instability of ink ejection.

The content of the monomer component having a COOH group or a salt thereof, a $SO_3H$ group or a salt thereof, or a $H_3PO_4$ group or a salt thereof is preferably in the range of about 0.1% by mole to 100% by mole, and more preferably in the range of about 30% by mole to 100% by mole, with respect to the total amount of the monomers of the resulting polymers.

In addition, the acid value of a polymer having a COOH group or a salt thereof is preferably in the range of about 100 to about 400, and more preferably in the range of about 150 to about 400. In contrast, the acid value of a polymer having a $SO_3H$ group or a salt thereof, or a $H_3PO_4$ group or a salt thereof is preferably in the range of about 100 to about 400.

These water-soluble polymers may be used alone or in combination. However, polymers having a COOH group as a hydrophilic group are preferable, since they coagulate well when brought into contact with a coagulant described later.

In the invention, at least one color ink contains a coagulant for coagulating a black ink. A polyvalent metal salt, a cationic polymer, a primary, secondary, or tertiary amine salt, a quaternary ammonium salt, a cationic surfactant, and/or an electrolyte may be used as the coagulant. A cationic dye may be used not only as the colorant but also as the coagulant. Among them, a polyvalent metal salt is preferable.

Examples of the polyvalent metal salt include compounds containing a polyvalent metal ion, such as an aluminium, barium, calcium, copper, iron, magnesium, manganese, nickel, tin, titanium, or zinc ion. Specific examples thereof include salts of the polyvalent metal ions with inorganic acids such as hydrochloric acid, hydrobromic acid, hydroiodic acid, sulfuric acid, nitric acid, phosphoric acid, or thiocyanic acid, organic carboxylic acids such as acetic acid, oxalic acid, lactic acid, fumaric acid, phthalic acid, citric acid, salicylic acid, or benzoic acid, or organic sulfonic acids. More specific examples thereof include aluminium chloride, aluminium bromide, aluminium sulfate, aluminium nitrate, sodium aluminium sulfate, potassium aluminium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate. Among them, preferable are aluminium sulfate, calcium chloride, calcium nitrate, calcium acetate, magnesium chloride, magnesium nitrate, magnesium sulfate, magnesium acetate, tin sulfate, zinc chloride, zinc nitrate, zinc sulfate, zinc acetate, and aluminium nitrate.

When a polyvalent metal salt is used as the colorant in the color ink, the content of the polyvalent metal salt is preferably about 0.01% by mass to about 5% by mass with respect to the total amount of the color ink. A content of the polyvalent metal salt of less than 0.01% by mass may not provide sufficient effects of the addition. On the contrary, a content of the polyvalent metal salt of over 5% by mass may cause more frequent clogging.

Alternatively, a cationic water-soluble polymer, a primary, secondary, or tertiary amine salt, a quaternary ammonium salt, and/or an electrolyte may be used as a coagulant aid.

Preferable examples of the cationic water-soluble polymer include: copolymer and homopolymers made of a monomer having a cationic functional group such as N,N-dimethylaminoethyl methacrylate, N,N-dimethylaminoethyl acrylate, N,N-dimethylamino metacrylamide, N,N-dimethylamino acrylamide, vinylpyridine, and vinylpyrrolidone; polyethyleneimines, polyamines, and polyamides. Other examples thereof include various water-soluble polymers including cationic glucide such as glucosamine and chitosan, acrylic polymers, polyesters, polyvinyl alcohols, polyvinylpyrrolidones, and polyurethanes.

Examples of the quaternary ammonium salt compound include dodecyl trimethyl ammonium chloride, dodecylbenzyl trimethyl ammonium chloride, dodecyl dimethyl benzyl ammonium chloride, stearyl trimethyl ammonium chloride, benzyl tributyl ammonium chloride, benzalkonium chloride, and cetyl trimethyl ammonium chloride. Examples of the primary, secondary, and tertiary amine salt compounds include ethyleneoxide adducts of higher alkylamines such as dihydroxyethylstearylamine; pyridinium salt compounds such as cetylpyridium chloride and cetylpyridium bromide; and imidazoline-type cationic compounds such as 2-heptadecenyl-hydroxyethylimidazoline.

Examples of the electrolyte include monovalent electrolytes, including inorganic salts such as sodium chloride, sodium sulfate, sodium sulfite, and sodium nitrate; and salts of an alkali material with an organic acid such as acetic acid, lactic acid, benzoic acid, or citric acid.

The water-soluble organic solvent is contained in each of the black ink and the color inks in the invention to prevent the ink to solidify, and examples thereof include polyvalent alcohols and derivatives thereof such as alkyl ethers thereof. Specific examples thereof include glycerin, polyethylene glycol, polypropylene glycol, diethylene glycol, 2-(2- butoxyethoxy) ethanol, diethylene glycol phenyl ether, propylene glycol, propylene glycol monomethy ether, butylene glycol, triethylene glycol, thiodiglycol, hexylene glycol, ethylene glycol methyl ether, diethylene glycol methyl ether, pentanediol, hexanetriol, and trimethylolpropane. These water-soluble organic solvents may be used alone or in combination.

Other examples thereof include, but are not limited to, alcohols such as methyl alcohol, ethyl alcohol, n-propyl alcohol, isopropyl alcohol, n-butyl alcohol, hexyl alcohol, and benzyl alcohol; amides such as dimethylformamide and dimethylacetamide; ketones and keto alcohols such as acetone and diacetone alcohol; solvents having a high boiling point and including at least one nitrogen atom such as triethanolamine, diethanolamine, pyrrolidone, N-methyl-2-pyrrolidone, and 1,3-dimethyl-2-imidazolidinone; sulfur-containing solvents such as dimethylsulfoxide, diethylsulfoxide, sulfolane, and thiodiethanol; saccharides and derivatives thereof, such as glucose, maltose, amylose (dextrin), cellulose, and sodium alginate; and gum arabic.

The content of the water-soluble organic solvent is about 1 to about 50% by mass with respect to the total ink weight. A content thereof of less than 1% by mass does not provide moisture retaining action. A content thereof of over 50% by mass increases an ink viscosity and then prohibits ink ejection.

The inks used in the invention may include a penetrant for the purpose of adjusting the permeability of the ink so that the contact angle between a recording material and the ink when one second has lapsed from the contact becomes 50° or less, and for the purpose of adjusting the surface tension of the ink. A surfactant or a penetrative solvent may be used as the penetrant. The surfactant can be any of an anionic surfactant, a nonionic surfactant, a cationic surfactant, and an amphoteric surfactant, and is preferably an anionic surfactant or a nonionic surfactant. Examples of the anionic surfactant include alkylbenzenesulfonates, alkylphenylsulfonates, alkylnaphthalenesulfonates, higher fatty acid salts, sulfates of higher fatty acids, sulfonates of higher fatty acids, sulfates and sulfonates of higher alcohol ethers, higher alkyl sulfosuccinates, polyoxyethylene alkyl ether carboxylates, polyoxyethylene alkyl ether sulfates, alkylphosphates, and polyoxyethylene alkyl ether phosphates. Specific preferable examples thereof include dodecylbenzenesulfonates, isopropylnaphthalenesulfonates, monobutylphenylphenol monosulfonates, monobutylbiphenylsulfonates, monobutylbiphenylsulfonates, and dibutylphenylphenol disulfonates.

Examples of the nonionic surfactant include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamines, polyoxyethylene fatty acid amides, alkylalkanolamides, polyethylene glycol-polypropylene glycol block copolymers, acetylene glycol, and polyoxyethylene adducts of acetylene glycol. Specific preferable examples thereof include polyoxyethylene nonyl phenyl ether, polyoxyethylene octyl phenyl ether, polyoxyethylene dodecyl phenyl ether, polyoxyethylene alkyl ethers, polyoxyethylene fatty acid esters, sorbitan fatty acid esters, polyoxyethylene sorbitan fatty acid esters, fatty acid alkylol amides, polyethylene glycol-polypropylene glycol block copolymers, acetylene glycol, and polyoxyethylene adducts of acetylene glycol.

In addition, a silicone surfactant such as polysiloxane oxyethylene adducts; a fluorinated surfactant such as perfluoroalkylcarboxylates, perfluoroalkylsulfonates, and oxyethylene perfluoroalkyl ethers; and/or a biosurfactant such as spiculisporic acid, rhamnolipids, and lysolecithins may also be used as the penetrant.

These surfactants may be used alone or in combination. The amount of the surfactant added is preferably about 0.001 to about 5% by mass, and particularly preferably about 0.01 to about 3% by mass with respect to the total ink quantity. An amount of the surfactant added of less than 0.001% by mass may lead to insufficient permeability or large fluctuation in surface tension, and the resulting ink may become unstable. Alternatively, an addition amount of the surfactant of more than 5% by mass may increase an ink viscosity and then may cause more frequent clogging at nozzle tips.

In addition, a compound represented by the following formula may be used as the penetrant.

$$R-O-XnH \quad (1)$$

In formula (1), R represents a functional group selected from alkyl, alkenyl, alkynyl, phenyl, alkylphenyl, alkenylphenyl, and cycloalkyl groups having 4 to 8 carbon atoms; X represents an oxyethylene or oxypropylene group; and n is an integer of 1 to 4.

Typical examples of the compound represented by formula (1) include ethylene glycol monobutyl ether, diethylene glycol monobutyl ether, propylene glycol monobutyl ether, diethylene glycol monohexyl ether, dipropylene glycol monobutyl ether, triethylene glycol monobutyl ether, triethylene glycol monohexyl ether, diethylene glycol monocyclohexyl ether, triethylene glycol monophenylethyl ether, and dihydroxypropylene oxyethylene monopentyl ether. Diethylene glycol monobutyl ether is preferable among them. The compound represented by formula (1) is contained in the ink in an amount of preferably about 1 to about 20% by mass, and more preferably about 1 to about 10% by mass with respect to the total ink quantity. A content of the compound represented by formula (1) of more than 20% by mass may instabilize ink ejection. On the contrary, a content of the compound represented by formula (1) of less than 1% by mass may result in insufficient effects of the addition.

Hereinafter, other additives will be described.

Examples of the hydrotropic agent include carboxylates such as sodium butyrate and sodium salicylate; aromatic sulfonates such as sodium toluenesulfonate; lower alcohols such as ethyl alcohol; urea; and acetamides.

Examples of the chelating agent include ethylenediamine tetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediamine tetraacetic acid (CyDTA), diethylenetriamine-N,N,N', N'',N'',-pentaacetic acid (DTPA), and glycolether diamine-N,N,N',N'-tetraacetic acid (GEDTA).

Examples of the clathrate compound include urea, thiourea, desoxycholic acid, bis-(N,N'-tetramethylene benzidine), cyclophane, and cyclodextrin, and preferable are urea and cyclodextrin.

The pH of the ink in the invention may be adjusted. The pH of the ink is preferably about 7 to about 10. An ink pH of over 10 may result in adverse effects such as corrosion, dissolution and peeling of head materials. Examples of a pH adjusting agent include alkaline compounds such as sodium hydroxide, potassium hydroxide, lithium hydroxide, sodium sulfate, acetates, lactates, benzoates, triethanolamine, diethanolamine, ethanolamine, ammonia, 2-amino-2-methyl-1-propanol (AMP), ammonium phosphate, sodium phosphate, and lithium phosphate; and organic and inorganic acids such as acetic acid, hydrochloric acid, nitric acid, sulfuric acid, phosphoric acid, citric acid, oxalic acid, malonic acid, boric acid, phosphorous acid, lactic acid, propionic acid, and p-toluenesulfonic acid. In addition, the pH adjusting agent may be any other ordinary pH buffer or Good buffer, but is not limited to these examples.

Further, the inks in the invention may also contain an oxidant, an antioxidant, a reducing agent, an enzyme, a bactericide, an antifoaming agent, an abrasive, and/or any other additive.

The inks used in the invention are prepared by mixing the above ink components. In particular, when an ink contains a pigment (including carbon black) as a colorant, and a dispersant, the ink may be prepared by adding a predetermined amount of the pigment into an aqueous solution containing a predetermined amount of the dispersant; sufficiently stirring the resultant mixture, agitating the mixture with a dispersing machine, removing coarse particles from the mixture by centrifugation or the like, adding other components such as a solvent and an additive to the mixture, stirring the resultant and filtering the mixture. A dense dispersion of a pigment may be first prepared and then diluted during preparation of inks. Alternatively, a pigment is added to a mixture of a solvent, water, and a dispersant, and then the resulting mixture may be stirred by using a dispersing machine.

The number of particles (mainly, carbon black particles) having a particle diameter of 0.5 μm or more contained in one liter of the black ink used in the invention is preferably about $7.5 \times 10^{10}$ or less, and more preferably about $5 \times 10^{10}$ or less. If the number of the particles having a diameter of 0.5 μm or more is greater than $7.5 \times 10^{10}$, the black ink may provide poor printing reliability.

In the invention, the number of particles having a diameter of not smaller than 0.5 μm is defined as a value measured by Accusizer (registered trademark) 770 Optical Particle Sizer (manufactured by Particle Sizing Systems). The measuring device optically detects particles passing through the measuring cell thereof.

The number of particles having a diameter of at least 0.5 μm are measured by placing 2 μl of a black ink sample to be analyzed in the measuring cell, measuring the number of the particles in accordance with a predetermined measurement procedure, and calculating from the result a value when the amount of the sample ink is one liter. The number of particles having a diameter of not smaller than 0.5 μm may be reduced by preparing from a pigment (carbon black) dispersion an aqueous dispersion of the pigment or an ink, and subsequently centrifuging or filtering the aqueous dispersion or the ink.

The viscosity of each of the inks used in the invention is preferably about 1.5 to about 5.0 mPa·s, and more preferably about 1.5 to about 3.5 mPa·s. An ink viscosity of less than 1.5 mPa·s may result in decreased ejection stability. On the contrary, an ink viscosity of greater than 10 mPa·s may result in decreased ejecting properties, making recovery from clogging difficult.

The conductivity of each of the inks used in the invention greatly depends on the additives used in the ink, and may not be definitely specified. However, in general, the conductivity of the black ink is preferably about 0.05 to about 0.4 S/m, and more preferably about 0.07 to about 0.3 S/m. In contrast, the conductivity of each of the color inks is generally preferably about 0.05 to about 2 S/m, and more preferably about 0.07 to about 1.5 S/m.

When the conductivity of each ink is out of the range described above, the storage stability of the ink tends to decline.

The pH of each of the inks used in the invention is preferably about 6.0 to about 11.0, and more preferably about 7.5 to about 9.0. An ink pH of less than 6.0 may cause more frequent clogging at nozzle tips, while an ink pH of more than 11.0 may lead to corrosion or dissolution of ink head components.

Hereinafter, the ink jet recording method of the invention will be described.

In the ink jet recording method of the invention, images are recorded using an ink set for ink jet recording of the invention. As described above, the ink set includes a black ink, and one or more color inks. The one or more color inks include at least one coagulant-containing color ink. The images are printed under the following conditions (1) to (3):
(1) The printing density of the black ink is about 0.39 to about 0.62 mg/cm$^2$ (about 2.5 to about 4 mg/inch$^2$);
(2) The total printing density of the at least one coagulant-containing color ink used is about 0.12 to about 0.62 mg/cm$^2$ (about 0.8 to about 4 mg/inch$^2$); and
(3) The total printing density of the black ink and the at least one coagulant-containing color ink used is about 0.93 mg/cm$^2$ (about 6 mg/inch$^2$) or less.

As described above, the ink jet recording method of the invention provides excellent printing quality by adjusting the printing density of images. Deterioration in character quality seems to be ascribed to a part of ink droplets not penetrating a recording material but spreading in the lateral direction of the recording material. Accordingly, the character quality may be improved by adjusting (decreasing) the printing density. When a printing density is decreased in printing images with ordinary ink sets for ink jet recording, which exhibit high penetration into a recording medium, the ink sets cannot provide high optical density. However, the ink set for ink jet recording used in the ink jet recording method of the invention provides both a high optical density and superior character quality, since the time interval between a time when ejection of a coagulable agent-containing black ink has finished and a time when ejection of a coagulant-containing color ink has started or vice versa is a short period of time in printing of images.

In the ink jet recording method of the invention, the printing density of the black ink is essentially about 0.39 to about 0.62 mg/cm$^2$ (about 2.5 to about 4 mg/inch$^2$), more preferably about 0.40 to about 0.55 mg/cm$^2$, and still more preferably about 0.42 to about 0.52 mg/cm$^2$. A printing density of the black ink of less than 0.39 mg/cm$^2$ is insufficient to completely color the portions to be black, causing images with missing portions in the form of white lines. On the contrary, a printing density of the black ink of more than 0.62 mg/cm$^2$ leads to an excessive ink quantity on a recording material, which in turn leads to bleeding of the ink.

In the ink jet recording method of the invention, the total printing density of the at least one coagulant-containing color ink used is essentially about 0.12 to about 0.62 mg/cm$^2$ (about 0.8 to about 4 mg/inch$^2$), and more preferably about 0.15 to about 0.50 mg/cm$^2$. When the total printing density of the coagulant-containing color ink(s) used is less than 0.12 mg/cm$^2$, the amount of the coagulant-containing color ink(s) that react with the black ink is small, resulting in a low optical density. On the other hand, when the total printing density of the coagulant-containing color ink(s) that react with the black ink is more than 0.61 mg/cm$^2$, the amount of the color ink(s) exceed that of the black ink, and, when black texts or images are printed, colors other than black are improperly distinguished.

In the ink jet recording method of the invention, the total printing density of the black ink and the at least one coagulant-containing color ink used is essentially about 0.93 mg/cm$^2$ (about 6 mg/inch$^2$) or less, more preferably about 0.9 mg/cm$^2$ or less, and still more preferably about 0.8 mg/cm$^2$ or less. If the total printing density of the black ink and the at least one coagulant-containing color ink used is more than 0.93 mg/cm$^2$, the resulting character quality is very low.

In the ink jet recording method of the invention, the printing density is a printing density when images are printed batchwise.

In the ink jet recording method of the invention, the ratio (mass ratio) of the black ink to the color inks used greatly depends on the compositions of the inks, and the kinds of coagulant(s) contained in the color inks, which coagulant affects the reactivity between the black ink and the color inks, but the ratio of the black ink to the color inks is preferably in the range of about 1:0.25 to about 1:1.

In the ink jet recording method of the invention, the printing density is an important factor for character quality, thin-line reproducibility, and outline portions. However, the printing density and bleeding are not problematic for the insides of outlines of solid images. Accordingly, outlines should be printed at the above printing density, but the insides of the outlines may be printed at a printing density of more than 0.93 mg/cm$^2$ in order to obtain a higher optical density and avoid missing portions in the resultant images.

In the ink jet recording method of the invention, the time interval between a time when ejection of a black ink has finished and a time when ejection of a color ink has started or vice versa is preferably about 80 msec. or less. A printing time interval of 80 msec or less provides higher optical density. In contrast, when the printing time interval is more than 80 msec., most of earlier ejected ink may penetrate a recording medium, and therefore the earlier ejected ink may not sufficiently react with subsequently ejected inks in the vicinity of the recording material surface, resulting in a low optical density. The printing time interval is more preferably about 40 msec. or less.

In the ink jet recording method of the invention, it is preferable that a carriage equipped with heads for black, cyan, magenta, and yellow inks conducts only one scan, in which a black ink and at least one coagulant-containing color ink are ejected, to print an image (so-called batch printing). The sequence of ejection of the coagulant-containing color ink(s) and that of the black ink is not particularly limited, but ejecting the coagulant-containing color ink preferably precedes ejecting the black ink from the viewpoint of the difference between a density during ejection in the forward movement of the carriage and that during ejection in the backward movement. Accordingly, a high-speed printing machine can have a color (cyan or magenta) ink head, a black ink head, a color (magenta or cyan) ink head, and a yellow ink head in that order, and both cyan and magenta color inks include a coagulant. For example, when a cyan ink head, a black ink head, a magenta ink head, and a yellow ink head are disposed in that order, cyan and black images are formed in a first scan, and magenta and black images are formed in a second scan. However, the above configuration is just an example and not intended to exclude other configurations. For the purpose of optimizing the tint and density difference of printed images, three-color (cyan, black, and magenta) inks may be ejected in one scan, or a head for a yellow ink which includes a coagulant may adjoin a black ink head.

It is quite important that the printing density is within the range as described above in the ink jet recording method of the invention. However, the printing densities in micro-areas do not always satisfy the above range, since the ink jet recording is performed by on-off dot control. Accordingly, it is preferable to enhance a printing resolution so as to divide the image-forming surface of a recording medium into the smallest micro printing areas possible and to average printing densities of the areas. The printing resolution is preferably 600 dpi or more, and more preferably 1,200 dpi or more.

The ink jet recording apparatus of the invention has a container for containing an ink set for ink jet recording comprising a black ink and one or more color inks including at least one coagulant-containing color ink; a conveyor for conveying a recording material; ink jet recording heads for printing an image by ejecting each ink onto the recording material conveyed by the conveyor; and an image signal input unit for inputting an image signal to the ink jet recording heads; wherein the ink set for ink jet recording is the ink set for ink jet recording described above; and the image is printed by using the black ink, and the one or more color inks containing the at least one coagulant-containing color ink under the following conditions (1) to (3).

(1) The printing density of the black ink is about 0.39 to about 0.62 mg/cm$^2$ (about 2.5 to about 4 mg/inch$^2$).
(2) The total printing density of the at least one coagulant-containing color ink used is about 0.12 to about 0.62 mg/cm$^2$ (about 0.8 to about 4 mg/inch$^2$).
(3) The total printing density of the black ink and the at least one coagulant-containing color ink used is about 0.93 mg/cm$^2$ (about 6 mg/inch$^2$) or less.

Use of the ink jet recording apparatus of the invention allows high-speed ink jet recording which has a fast drying speed of inks and provides images with a high optical density and high character quality and without mottles.

For high-speed printing, the ink jet recording apparatus of the invention preferably has a high movement speed (scanning speed) of the carriage equipped with print heads and having a large printing area per scan. It is difficult to drastically raise the scanning speed in consideration of the accuracy of printing positions. On the other hand, a large printing area per scan has been being attained due to progress in head-manufacturing techniques. For high-speed printing, it is effective to reduce the number of scanning operations necessary to form an image. The length of the ink jet recording head is preferably about 20 mm or more, and more preferably about 25 mm or more. A length of the ink jet recording head of less than 20 mm may impede high-speed printing.

EXAMPLES

Hereinafter, the invention will be described in more detail with reference to Examples.

Preparation of Inks (1) Preparation of Black Inks 1 to 4

Demineralized water is added to CAB-O-JET300 (manufactured by Cabot Corporation, self dispersion index: 100%) to a pigment concentration of 10% by mass. The resulting solution is centrifuged at 8,000 rpm for 30 minutes, and thus a pigment dispersion liquid for measurement is obtained. Part of the pigment dispersion liquid is sampled and the solvent in the sample is completely evaporated to determine the pigment content of the sample. From the result, demineralized water is added to the pigment dispersion liquid (after centrifugal separation processing) to obtain a pigment concentration of 8% by mass, and thus a pigment dispersion liquid is obtained. Components shown in Table 1 are added to the pigment dispersion liquid. One mol/liter NaOH is added to the resultant dispersions to adjust the pH of each dispersion at 8, and the adjusted dispersions are filtered through a membrane filter having a pore size of 2 μm. Thus, black inks 1 to 4 are obtained.

(2) Preparation of Cyan Inks 1 to 4, Magenta Inks 1 to 4, and Yellow Inks 1 to 4

A dye and components shown in Table 1 are mixed and the resultant mixture is stirred. One mol/liter NaOH is added to the resultant dispersions to adjust the pH of each dispersion at 7, and the adjusted dispersions are filtered through a membrane filter having a pore size of 0.45 μm. Thus, cyan inks 1 to 4, magenta inks 1 to 4, and yellow inks 1 to 4 are obtained.

The surface tension of each of the inks thus obtained is measured by using a Wilhelmy surface tension balance under an environment of 23° C. and 55% RH. The results are summarized in Table 1.

The contact angle of each ink to a recording material is measured under an environment of 23° C. and 55% RH, by using FIBRO 1100DAT MKII Dynamic absorption Tester (manufactured by FIBRO system). In the measurement, the droplet quantity is set at 4.0 μl. The dripping force is set at 6.0. Given that a time when dripping has just started is 0 seconds, dynamic contact angles are measured over a period of 100 seconds from the initiation or, if the tester automatically terminates the measurement within 100 seconds, until termination. The value when one second has lapsed from the initiation is designated as the contact angle. FX-L paper manufacture by Fuji Xerox Co., Ltd. is used as the recording material.

TABLE 1

| Ink color | | Black ink | | | | Cyan ink | | | | Magenta ink | | | | Yellow ink | | | |
|---|---|---|---|---|---|---|---|---|---|---|---|---|---|---|---|---|---|
| Ink No. | | 1 | 2 | 3 | 4 | 1 | 2 | 3 | 4 | 1 | 2 | 3 | 4 | 1 | 2 | 3 | 4 |
| *4 | Pigment dispersion liquid | 37.5 | 37.5 | 37.5 | 37.5 | | | | | | | | | | | | |
| | C.I. Direct Blue-199 | | | | | 3 | 3 | 3 | 3 | | | | | | | | |
| | C.I. Acid Red 52 | | | | | | | | | 3 | 3 | 3 | 3 | | | | |
| | C.I. Acid Yellow 23 | | | | | | | | | | | | | 3.5 | 3.5 | 3.5 | 3.5 |
| | Diethylene glycol | 20 | 20 | 20 | 20 | 20 | 20 | 20 | 20 | 20 | 20 | 20 | 20 | 20 | 20 | 20 | 20 |
| | Diethylene glycol monobutyl ether | | | | 3 | | | 5 | 5 | | | 5 | 5 | | | 5 | 5 |
| | Surfactant A$^{(1)}$ | 1 | | 1 | | 2 | 2 | | | 2 | 2 | | | 2 | 2 | | |
| | Surfactant B$^{(2)}$ | | 0.3 | | 0.5 | | | 1 | 1.5 | | | 1 | 1.5 | | | 1 | 1.5 |
| | Magnesium nitrate 6H$_2$O | | | | | 3 | | 3 | 3 | 3 | | 3 | 3 | 3 | | 3 | 3 |
| | Anionic polymer$^{(3)}$ | 0.5 | 0.5 | | 0.5 | | | | | | | | | | | | |
| | Water | 41 | 41.7 | 41.5 | 38.5 | 72 | 75 | 68 | 67.5 | 72 | 75 | 68 | 67.5 | 71.5 | 74.5 | 67.5 | 67 |
| | Contact angle (°) after 1 sec. | 20 | 65 | 20 | 40 | 21 | 21 | 40 | 38 | 20 | 20 | 41 | 38 | 20 | 21 | 41 | 38 |
| | Surface tension (mN/m) | 32 | 42 | 31 | 42 | 30 | 30 | 37 | 35 | 30 | 30 | 37 | 35 | 30 | 30 | 37 | 35 |

TABLE 1-continued

| Ink color | Black ink | | | | Cyan ink | | | | Magenta ink | | | | Yellow ink | | | |
|---|---|---|---|---|---|---|---|---|---|---|---|---|---|---|---|---|
| Ink No. | 1 | 2 | 3 | 4 | 1 | 2 | 3 | 4 | 1 | 2 | 3 | 4 | 1 | 2 | 3 | 4 |

[1] Polyoxyethylene adduct of acetylene glycol
[2] Polyoxyethylene 2-ethylhexyl ether
[3] Sodium salt of styrene/methacrylic acid copolymer (molecular weight: 7,000)
[4] Composition ratio (mass ratio)

Examples 1 and 2, and Comparative Examples 1 to 5

As shown in Table 2, the inks are combined to prepare ink sets of Examples 1 and 2, and Comparative Examples 1 to 5, and the following evaluations are preformed for the ink sets. The results are summarized in Table 2.

Images to be evaluated are printed by a prototype printer manufactured by Fuji Xerox Co., Ltd. FX-L paper (manufactured by Fuji Xerox Co., Ltd.) is used as the recording material. Two patterns, a 12-pitch Chinese letter string and a solid image, are output under the following conditions, and the drying time, the optical image density, and character quality of the images are evaluated.

The prototype printer has a head having a nozzle pitch of 1200 dpi and a length of 25.4 mm, and the volume of one droplet of each of black and color ink heads is 5 pl.

In addition, the printing resolution of the letter string and that of the solid image are separately set as follows.

The Printing Density of the Black Ink 12-pitch Chinese letter string: 600×1200 dpi, 0.56 mg/cm$^2$; and solid image: 1200×1200 dpi, 1.12 mg/cm$^2$.

A cyan ink head, a black ink head, and a magenta ink head are disposed in that order in order that a color ink is ejected before ejection of the black ink. In addition, the images are printed by batchwise reciprocatory printing. That is, a cyan image and a black image are printed in the forward movement of the head, while a magenta image and a black image are printed in the backward movement. The time interval between a time when printing of a cyan image has finished and a time when printing of a black image has started, or vice versa, or the time interval between a time when printing of a black image has finished and a time when printing of a magenta image has started, or vice versa is 33 msec.

Further, color ink printing is performed at 50% coverage. (12-pitch Chinese letter string area: 0.28 mg/cm$^2$; solid area: 0.56 mg/cm$^2$.)

The prototype ink jet recording apparatus has a container for the ink set, a conveyor, ink jet recording heads, and an image signal input unit.

Ink Drying Time

After a solid image has been printed on FX-L paper, another FX-L paper is superimposed on the image-formed surface of the FX-L paper. A check is made to determine whether a part of the image is transferred to the another FX-L paper. A term from a time when the image has been printed to a time just before another FX-L paper is superimposed is lengthened, and the above operation is repeated. When the image transfer is not observed for the first time, the corresponding term is designated as the ink drying time.

Optical Image Density

The image density of the solid image is measured by using an optical densitometer, X-Rite Model 404 (manufactured by X-Rite Inc.), and the optical image density is evaluated in accordance with the following criteria.

⊚: 1.4 or more.
○: 1.3 or more, and less than 1.4.
Δ: 1.2 or more, and less than 1.3.
X: Less than 1.2.

Character Quality

A line of 12-pitch Chinese letters is printed, and bleeding thereof is visually examined and evaluated in accordance with the following criteria.

⊚: Sharp characters without bleeding
○: Sharp characters without substantial bleeding
Δ: Slightly thicker characters with slight bleeding
X: Definitely thicker characters with apparent bleeding Image Defect Image defects such as uneven density and others in the solid image are visually examined and evaluated in accordance with the following criteria.

○: No unevenness in density.
Δ: Slight unevenness in density.
X: Apparent unevenness in density or white lines (missing portions).

TABLE 2

| | Ink used | | Evaluation results | | | |
|---|---|---|---|---|---|---|
| | Black ink | Color ink | Optical image density | Drying time | Character quality | Image defects |
| Example 1 | Black ink 1 | Magenta ink 1, cyan ink 1 | ⊚ | 1 second or less | ⊚ | ○ |
| Example 2 | Black ink 1 | Magenta ink 3, cyan ink 3 | ⊚ | 1 second or less | ⊚ | ○ |
| Comparative Example 1 | Black ink 2 | Magenta ink 1, cyan ink 1 | ○ | 5 seconds | ⊚ | X |
| Comparative Example 2 | Black ink 3 | Magenta ink 1, cyan ink 1 | X | 1 second or less | ⊚ | ○ |
| Comparative Example 3 | Black ink 4 | Magenta ink 4 cyan ink 4 | ○ | 1 second or less | ○ | X |

TABLE 2-continued

|  | Ink used | | Evaluation results | | | |
|---|---|---|---|---|---|---|
|  | Black ink | Color ink | Optical image density | Drying time | Character quality | Image defects |
| Comparative Example 4 | Black ink 1 | Magenta ink 2, cyan ink 2 | X | 1 second or less | ◯ | ◯ |
| Comparative Example 5 | Black ink 4 | Magenta ink 3, cyan ink 3 | ◯ | 1 second or less | ◯ | Δ |

Table 2 indicates that ink sets of Examples 1 and 2 are excellent in all evaluations, i.e., the ink drying time, the optical image density, the character quality, and the image defect.

Example 3, and Comparative Examples 6 to 8

Images are printed using the black ink 1 and the magenta and cyan inks 1 at a printing density shown in Table 3, and the optical image density, character quality, and image defect of the images are evaluated. In Comparative Example 8, a 3-pl head (head ejecting droplets, the volume of which is 3 pl) is used as a black ink head in place of a 5-pl head used in Example 3 and Comparative Examples 6 and 7. In addition, color ink printing is performed at printing coverage of 50% or 100%. The results are summarized in Table 3.

TABLE 3

|  | Black ink | Color ink | Optical image density | Character quality | Image quality defect |
|---|---|---|---|---|---|
| Example 3 | 600 × 1200, 5 pl 0.56 mg/cm² | 600 × 1200, 5 pl, 50% 0.28 mg/cm² | ◎ | ◎ | ◯ |
| Comparative Example 6 | 1200 × 1200, 5 pl 1.12 mg/cm² | 600 × 1200, 5 pl, 100% 0.56 mg/cm² | ◎ | X | ◯ |
| Comparative Example 7 | 600 × 1200, 5 pl 0.56 mg/cm² | 600 × 1200, 5 pl, 100% 0.56 mg/cm² | ◎ | Δ | ◯ |
| Comparative Example 8 | 600 × 1200, 3 pl 0.34 mg/cm² | 600 × 1200, 5 pl, 50% 0.28 mg/cm² | X | ◯ | X |

Table 3 indicates that the ink set of Example 3 is superior in all the optical image density, character quality, and image defect of the ink.

Examples 4 to 5

Images are printed and evaluated in the same manner as in Example 1, except that a head carriage speed is set at ½ or ⅓ of that in Example 1 and that the time interval between a time when ejection of the black has finished and when ejection of a color ink has started or vice versa is set at 66 msec. or 99 msec. The results are summarized in Table 4.

TABLE 4

|  | Black/color-ink printing-time interval | Optical image density | Drying time | Character quality | Image defect |
|---|---|---|---|---|---|
| Example 4 | 66 msec. | ◯ | 1 second or less | ◎ | ◯ |
| Example 5 | 99 msec. | Δ | 1 second or less | ◎ | ◯ |

Table 4 indicates that, when the printing time interval is 80 msec or less, images having an improved optical image density can be obtained.

What is claimed is:

1. An ink jet recording method of recording an image using an ink set for ink jet recording comprising a black ink and color inks including at least cyan, magenta, and yellow inks, the black ink comprising a colorant, an organic solvent, a coagulable agent and water, and at least one of the color inks being a coagulant-containing color ink comprising a colorant, an organic solvent and a coagulant, wherein the image is printed in such a manner that:

a contact angle of each of the black ink and the color inks to a recording material becomes about 50° or less after 1 second of contact;

a printing density of the black ink becomes about 2.5 to about 4 mg/inch²; a total printing density of the coagulant-containing color ink used becomes about 0.8 to about 4 mg/inch²; and a total printing density of the black ink and the coagulant-containing color ink used becomes about 6 mg/inch² or less.

2. The ink jet recording method of claim 1, wherein the time interval between a time when ejection of the black ink has finished and a time when next ejection of one of the color inks has started or between a time when ejection of the black color has started and a time when preceding ejection of one of the color inks has finished is about 80 msec. or less.

3. The ink jet recording method of claim 1, wherein each of the black ink and the color inks has a surface tension of about 40 mN/m or less, and the difference between the surface tension of the black ink and that of the coagulant-containing color ink is about 5 mN/m or less.

4. The ink jet recording method of claim 1, wherein the colorant in the black ink is self-dispersible carbon black.

5. An ink jet recording apparatus comprising:
a container for containing an ink set for ink jet recording;
a conveyor for conveying a recording material;

ink jet recording heads for printing an image by ejecting each ink onto the recording material conveyed by the conveyor; and an image signal input unit for inputting an image signal to the ink jet recording heads; wherein the ink set for ink jet recording includes a black ink and color inks including at least cyan, magenta and yellow inks, the black ink including a colorant, a water-soluble organic solvent, a coagulable agent and water, and at least one of the color inks being a coagulant-containing color ink including a colorant, a water-soluble organic solvent and a coagulant, wherein a contact angle of each of the black ink and the color inks to a recording material is about 50° or less after 1 second of contact, each of the black ink and the color inks has a surface tension of about 40 mN/m or less, and the difference between the surface tension of the black ink and that of the coagulant-containing color ink is about 5 mN/m or less; and the image is printed by using the black ink, and the one or more color inks containing the at least one coagulant-containing color ink, at a printing density of the black ink of about 2.5 to about 4 mg/inch$^2$, at a total printing density of the at least one coagulant-containing color ink used of about 0.8 to about 4 mg/inch$^2$, and at a total printing density of the black ink and the at least one coagulant-containing color ink used of about 6 mg/inch$^2$ or less.

* * * * *